United States Patent Office 2,945,871
Patented July 19, 1960

2,945,871
PREPARATION OF ARYL ESTERS

James G. Murray, Dayton, Ohio, assignor to Monsanto Chemical Company, St. Louis, Mo., a corporation of Delaware No Drawing. Filed Jan. 30, 1958, Ser. No. 712,072

6 Claims. (Cl. 260—410.5)

This invention relates to the synthesis of aryl esters by the reaction of olefinic hydrocarbons, carbon monoxide and certain substituted phenols. It is an object of the reaction to carry out the preparation of aryl esters while at the same time avoiding the alkylation of the phenols which are employed as a starting material.

It is also an object of the invention to produce aryl esters directly from olefins and certain phenols, thus obviating the necessity for providing an organic acid as one of the starting materials.

The direct preparation of aryl esters from phenols and carboxylic acids through the acid chloride or anhydride is well known. However, it is desirable to obtain the aryl esters directly from olefinic hydrocarbons, thus operating with only a single reaction step and avoiding the necessity of preparing acids as an intermediate in the manufacture of the desired aryl esters.

Phenols, when subjected to acidic conditions in the presence of olefins are very readily alkylated. Such a reaction is, however, undesirable when esters are to be made. For example, phenol in the presence of carbon monoxide, and an olefin, for example, ethylene, propylene, or the dimer or trimer thereof, together with a sulfuric acid catalyst, will react to give the alkylphenol.

It has now been found that specific substituted phenols may be reacted directly with olefinic hydrocarbons and carbon monoxide in the presence of mineral acids and combinations thereof to yield aryl esters. The substituted phenols are characterized by the presence of a halogen or nitro grouping, which in the case of the polycyclic aromatic phenols must be located on the same ring as the —OH group. Examples of typical substituted phenols having utility in the present invention include the group of halophenols, nitrohalophenols and nitrophenols. Examples of the halophenols include the monochlorophenols, the various dichlorophenols, trichlorophenols, tetrachlorophenols and pentachlorophenol. Polyhydric phenols substituted with halogen groups are also contemplated, e.g., 4,6-dibromoresorcinol. Other polyhydric halophenols which are contemplated in the present invention include the hydrolysis products of chlorinated biphenyl. Other halophenols which are contemplated in the present invention include the chlorinated derivatives of the bisphenols such as the 2,2′-bis[3,5-dichloro-4-hydroxyphenyl]propane having the following structure:

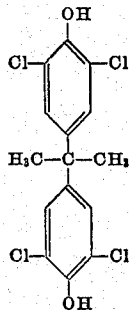

Other substituted phenols which are contemplated in the present invention include the various nitrophenols, such as mononitrophenol, dinitrophenol; nitrohalophenols such as 2-chloro-4-nitrophenol, 2,4-dichloro-5-nitrophenol; and other nitro-substituted or nitrohalo-substituted phenols corresponding to the biphenyl and bisphenol derivatives described above. Polycyclic-substituted aromatic phenols include the halo- and nitronaphthols, anthrols and phenanthrols such as 2,4-dichloro-1-naphthol; and 4-nitro-1-anthrol; and 1-chloro-4-nitro-2-phenanthrol.

The olefinic hydrocarbons which are adapted for the present process are, e.g.; ethylene, propylene, butylene, etc. and the olefin polymers, particularly the dimer, trimer and tetramers of the above olefins. A preferred group of olefins are the compounds having from 2 to 16 carbon atoms. The olefin employed in the present process may be a chemically pure material, or the various industrial types which are available, e.g., in the purification of cracking gases obtained in hydrocarbon processing.

The carbon monoxide required for the present process may be derived from various sources such as, e.g., water gas, producer gas, etc. Gases such as nitrogen, carbon dioxide, etc., which are commonly present in the industrial preparation of carbon monoxide or of the olefinic hydrocarbons, may be present without deleterious effect upon the chemical reaction.

The proportion in which the olefinic hydrocarbons, carbon monoxide and phenol are employed is substantially in the proportion of equimolar quantities of each of the three reactants. However, it is often desirable, particularly in the operation of a large-scale process, to make use of an excess of the olefin and carbon monoxide in order to make certain that the relatively expensive phenolic component is completely utilized.

The present reaction may be conducted at temperatures in the range of from 0° C. to 200° C., the preferred range being from 25° C. to 85° C. The use of superatmospheric pressure is desirable in the present process, preferably at least 100 pounds per square inch being maintained. A preferred range is from 300 to 3,000 pounds per square inch.

The catalysts employed in the present invention are the group of mineral acids including sulfuric acid, phosphoric acid, hydrofluoric acid, and boron trifluoride. Mixtures of these acids such as an equimolar amount of boron trifluoride with phosphoric acid are especially desirable. The proportion of the catalyst which is employed in the present process is not critical, and may vary from approximately 0.1 to 10 moles per mole of phenol. The reaction is conducted under substantially anhydrous conditions, although minor proportions of water may be tolerated.

The following examples illustrate specific embodiments of the present invention:

Example 1

Para-chlorophenyl isodecanoate was obtained by first preparing a solution of the catalyst dissolved in 192.8 g. of para-chlorophenol. The active catalyst was composed of boron trifluoride and phosphoric acid. The combination of the catalytic components was prepared by charging 1,392 g. of 85% phosphoric acid to a flask and heating the flask to drive off water until the residual 100% phosphoric acid thus produced corresponded to a 100% yield amounting to 1,182 g. The 100% phosphoric acid in the flask was then cooled with stirring while passing in boron trifluoride. This addition was continued until 952.3 g. of the boron trifluoride had been absorbed. This corresponded to a $BF_3/H_3PO_4$ molar ratio of 1.27.

In the present experiment 265.8 g. of the complex of boron trifluoride and phosphoric acid was added to the 192.8 g. of para-chlorophenol.

The above-described mixture was heated to 60° C. in a 1.5 liter-stirred autoclave. Before initiation of the reaction the bomb was purged and pressured to 850 p.s.i. with carbon monoxide at 60° C. Two moles of propylene trimer was then pumped into the autoclave over a 5 hour period. The total reaction time was six hours, during which time the carbon monoxide pressure was augmented from time to time to maintain a pressure of about 810–850 p.s.i., and the temperature was maintained at about 60°.

The pressure vessel was then cooled, the product removed and the crude material was taken up in 500 ml. of petroleum naphtha. In order to separate the organic layer, 36 ml. of water were also added, whereupon the lower catalyst layer separated readily. The organic layer was removed, washed with water and dilute caustic. The organic product was distilled to yield a substantially pure fraction of para-chlorophenyl ester in 67% yield. The purified product was subjected to infrared analysis and was found to have characteristics corresponding to the formula, $C_9H_{19}COOC_6H_4Cl$. The saponification equivalent of this ester was 285 (theoretical 282.8).

*Example 2*

The preparation of 2,4-dichlorophenyl isodecanoate was carried out utilizing 265.5 g. of the catalyst described in Example 1. The catalyst was dissolved in 244.5 g. (1.5 moles) of 2,4-dichlorophenol and the entire mixture charged to a 1.5 liter stirred autoclave. The reaction mixture was charged with carbon monoxide to a pressure of 820 p.s.i. at 55° C., and repressured several times to maintain this approximate pressure for a period of about seven hours. The charge of propylene trimer, 342 ml. corresponding to 2 moles, was pumped in over about five hours.

The bomb containing the reaction mixture was then cooled, after which the product was discharged, the organic layer separated and washed with water and dilute caustic. After drying, the organic product was fractionally distilled under reduced pressure to obtain the pure 2,4-dichlorophenyl isodecanoate in good yield.

*Example 3*

Ortho-nitrophenyl isodecanoate was prepared by dissolving 139 g. of o-nitrophenol in 177 g. of the catalyst complex described in Example 1. Carbon monoxide was pumped into the vessel until a pressure of 800 p.s.i. was reached and one and one-half moles of propylene trimer were then pumped in over a five hour period. The reaction was carried out at about 60° C. and the product removed as described in Example 1. Fractional distillation of the organic portion gave the pure ortho-nitrophenyl isodecanoate.

What is claimed is:

1. The process for producing aryl esters which comprises reacting an olefinic hydrocarbon, carbon monoxide, and an organic compound selected from the group consisting of halophenols, nitrohalophenols and nitrophenols in the presence of a mineral acid catalyst.

2. The process of producing aryl esters which comprises reacting an olefinic hydrocarbon, carbon monoxide, and a halophenol in the presence of a mixture of phosphoric acid and boron trifluoride at a temperature of from 25° C. to 85° C. at a pressure of from 300 to 3,000 pounds per square inch.

3. The process of producing aryl esters which comprises reacting an olefinic hydrocarbon, carbon monoxide, and a nitrophenol in the presence of a mixture of phosphoric acid and boron trifluoride at a temperature of from 25° C. to 85° C. at a pressure of from 300 to 3,000 pounds per square inch.

4. The process of producing p-chlorophenyl isodecanoate which comprises reacting substantially equimolar proportions of propylene trimer, carbon monoxide, and para-chlorophenol in the presence of a mixture of phosphoric acid and boron trifluoride at a temperature of from 25° C. to 85° C. at a pressure of from 300 to 3,000 pounds per square inch.

5. The process of producing 2,4-dichloroisodecanoate which comprises reacting substantially equimolar proportions of propylene trimer, carbon monoxide, and 2,4-dichlorophenol in the presence of a mixture of phosphoric acid and boron trifluoride at a temperature of from 25° C. to 85° C. at a pressure of from 300 to 3,000 pounds per square inch.

6. The process of producing ortho-nitrophenyl isodecanoate which comprises reacting substantially equimolar proportions of propylene trimer, carbon monoxide, and orth-nitrophenol in the presence of a mixture of phosphoric acid and boron trifluoride at a temperature of from 25° C. to 85° C. at a pressure of from 300 to 3,000 pounds per square inch.

References Cited in the file of this patent

UNITED STATES PATENTS

| | | |
|---|---|---|
| 1,979,717 | Vail | Nov. 6, 1934 |
| 2,467,206 | Gresham et al. | Apr. 12, 1949 |